Patented Oct. 7, 1952

2,613,212

UNITED STATES PATENT OFFICE 2,613,212

IMIDAZOLIDONE DERIVATIVES

Melvin D. Hurwitz, Philadelphia, and Robert W. Auten, Jenkintown, Pa., assignors to Rohm & Haas Company, Philadelphia, Pa., a corporation of Delaware No Drawing. Application October 26, 1950, Serial No. 192,351

3 Claims. (Cl. 260—309.7)

1

This invention relates to 2-imidazolidones having on a ring nitrogen atom thereof an N,N'-alkylene substituent in which two acyclic carbon atoms separate two nitrogen atoms. These compounds are of two types. One type of these compounds has the formula

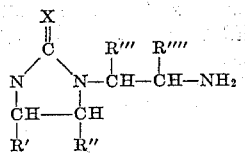

wherein X is oxygen or sulfur and the R substituents represent hydrogen or methyl groups. In the preferred compounds at least one of the pair R' and R" and one of the pair R''' and R'''' is hydrogen and the other is methyl.

The other type of compound is represented by the formula

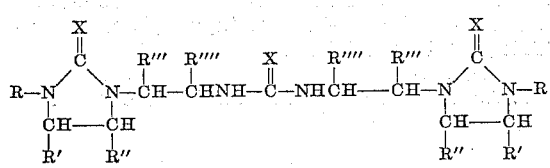

where the R substituents and also X have the same significance as above.

In the prior art it was proposed to react together urea and formaldehyde to form acyclic ureido derivatives. Reaction of urea and diethylenetriamine has also been observed to give ureidoethyl-2-imidazolidone.

It is now found, however, that this is but one of a number of products which can be obtained from the reaction of urea and diethylenetriamine. We have discovered that when at least one mole of diethylenetriamine is heated with a mole of urea there results a new compound, 1-(2-aminoethyl)-2-imidazolidone, as a principal product. The sulfur analogue is obtained when thiourea is used in place of urea. Furthermore, other dialkylenetriamines can be used in place of diethylenetriamine when two nitrogen atoms thereof are separated by two carbon atoms and there are hydrogen atoms on the nitrogen atoms. Thus, there may be used dialkylenetriamines of the formula

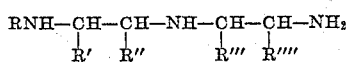

where the R substituents are hydrogen or lower alkyl, preferably methyl. These polyamines include diethylenetriamine, dipropylenetriamine, di(1,2-butylene)triamine, di(2,3-butylene)-triamine, N-methyldiethylenetriamine, N-ethyldiethylenetriamine, etc., corresponding to the above structural formula.

To prepare the aminoalkyl-2-imidazolidones, at least one mole of such a polyamine is mixed

2 with a mole of urea or thiourea and the mixture is heated between about 100° and 300° C. Ammonia is evolved and when about two moles of ammonia per mole of urea have been taken off, the reaction is interrupted. With reactants in equimolar ratios the chief product is the desired beta-aminoalkyl-2-imidazolidone. In some instances the product can be distilled at low pressures and thus purified.

The preparation of imidazolidones of this invention is illustrated by the following examples which give details of typical procedures. Parts are by weight.

Example 1

A reaction vessel equipped with stirrer, reflux condenser, and thermometer was charged with 1237 parts of diethylenetriamine of a purity of 91.7% and 600 parts of urea. The mixture was heated to about 130° C., at which point evolution of ammonia began. The temperature was raised as the reaction progressed until it was carried to 210° C. The resulting reaction product was distilled at low pressure. Between 155° C. and 163° C. at one mm. pressure there was obtained 1-beta-aminoethyl-2-imidazolidone in an amount of 896 parts. A water-soluble, crystalline residue remained in the distillation vessel in an amount of 300 parts. The distilled product had a nitrogen content of 32.30% (theory 32.56%) and a neutral equivalent of 127 (theory 129).

Example 2

There were charged to the reaction vessel 1240 parts of diethylenetriamine and 760 parts of thiourea. The mixture was stirred and heated to a final temperature of 230° C. Ammonia was evolved and heating was continued until 340 parts had been collected. The deep green product thus formed lost color as the melt was cooled. Ethanol was added to the product while it was still quite warm and the solution resulting was cooled under a nitrogen atmosphere. Crystals formed. They were filtered off and dried at 60° C. This product melted at 110° C., had a neutral equivalent of 145.5 (theory 145), and contained by analysis 41.5% of carbon, 7.4% of hydrogen, 29.9% of nitrogen, and 21.9% of sulfur (theory 41.4%, 7.6%, 29.0%, and 22.0% respectively), corresponding in composition to

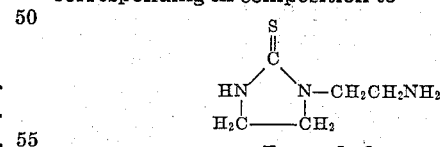

Example 3

There were mixed 131 parts of dipropylenetriamine and 60 parts of urea. The mixture was stirred and heated gradually to a temperature of 230° C. There was a loss in weight of 34 parts from the reaction mixture, this being the reaction vessel under reduced pressure. There was obtained at 180°–200° C. at about one millimeter pressure 115 parts of material which correspond in composition to 1-(beta-aminopropyl)-4-methyl-2-imidazolidone and 1-(beta-aminopropyl)-5-methyl-2-imidazolidone. The neutral equivalent found for the product was 159 (theory 159).

Example 4

There were mixed 849 parts by weight of N-(beta-N-methylaminoethyl)ethylenediamine and 435 parts of urea. The mixture was heated under reflux, the pot temperature increasing as ammonia was evolved. The temperature was carried to 280°–290° C., at which range 400 parts of a product distilled over which corresponded in composition to N-methyl-N'-beta-aminoethyl-2-imidazolidone,

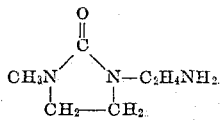

The product as obtained had a neutral equivalent of 146 (theory 143).

The beta-aminoalkyl-2-imidazolidones react with formaldehyde to form methylol compounds. These are useful for the treatment of cellulosic materials. Specifically, they can be applied to cotton and rayon fabrics for stabilizing and crushproofing with a peculiar advantage in improvement in abrasion-resistance of the treated fabric as compared with fabrics treated with urea-formaldehyde or melamine-formaldehyde condensates. The methylol derivatives are convertible to ethers by reaction with an alcohol in the presence of an acidic catalyst. Thus, reaction with a monohydric aliphatic alcohol yields alkoxymethyl derivatives, useful in coatings and laminations.

One mole of a beta-aminoalkyl-2-imidazolidone and one mole of urea or thiourea react to give a beta-ureidoalkyl-2-imidazolidone, a known type of compound. Two moles of a beta-aminoalkyl-2-imidazolidone and one mole of urea or thiourea react, when heated together until the theoretical amount of ammonia has been evolved, to give compounds of the structure

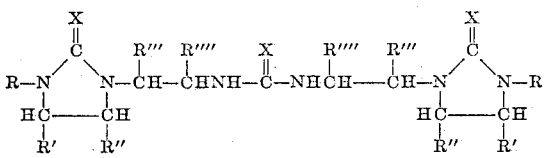

The same compound can be prepared by reacting together one mole each of a beta-aminoalkyl-2-imidazolidone and a beta-ureidoalkyl-2-imidazolidone and eliminating a mole of ammonia. A third method of preparing this type of compound is through reacting by condensing together two moles of a di-1,2-alkylenetriamine with three moles of urea or thiourea and eliminating six moles of ammonia. This last method requires mixing of reactants in the stated proportions and heating the resulting mixture between about 100° C. and 300° C. until the required amount of ammonia has been evolved.

The reactions are illustrated by the following preparations.

Example 5

There were mixed 172 parts of 1-beta-ureidoethyl-2-imidazolidone and 145 parts of 1-beta-aminoethyl-2-imidazolidinethione. The mixture was stirred and heated. At about 130° C. ammonia began to be evolved. The temperature was raised to 250° C. The reaction mixture was poured into a stainless steel vessel and cooled. A glassy solid formed. This product corresponds in composition to

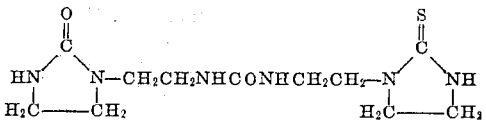

Example 6

There were mixed 431 parts of 95% pure diethylenetriamine and 378 parts of urea. The mixture was heated and at about 110° C. evolution of ammonia began. The temperature was gradually raised and carried finally to 250° C. The loss in weight was 217 parts, slightly more than the theory of 214. The reaction mixture was poured into a stainless steel tray and cooled. It formed a glassy solid. The nitrogen analysis of this material was 29.2% (theory 29.5%). It has the structure

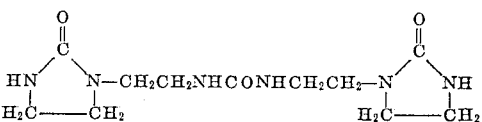

These are new compounds which are also of interest because of their reactive methylol and alkoxymethyl derivatives, having properties similar to those related above in connection with aminoethyl-2-imidazolidones and their derivatives. Both the aminoethyl-2-imidazolidones and the N,N'-bis(beta-1-imidazolidylethyl) ureas exhibit pesticidal activities.

We claim:

1. As a new chemical, a compound of the formula

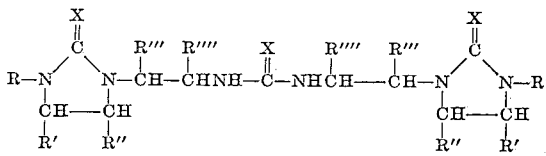

wherein the R substituents represent members of the class consisting of hydrogen and the methyl group and X is a member of the class consisting of oxygen and sulfur.

2. As a new chemical substance, a compound of the formula

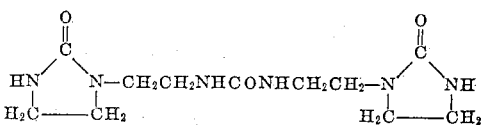

3. As a new chemical substance, a compound of the formula

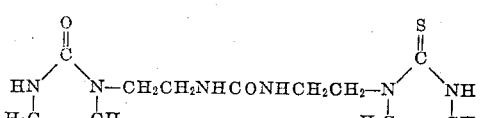

MELVIN D. HURWITZ.
ROBERT W. AUTEN.

REFERENCES CITED

The following references are of record in the file of this patent:

UNITED STATES PATENTS

| Number | Name | Date |
| --- | --- | --- |
| 2,517,750 | Wilson | Aug. 8, 1950 |